3,332,706
TRUCK FIFTH-WHEEL TRAILER MOUNTING FOR
PREVENTING JACKKNIFING
Robert William Miller, P.O. Box J, Benton, Pa. 17814
Filed Jan. 6, 1966, Ser. No. 519,135
4 Claims. (Cl. 280—432)

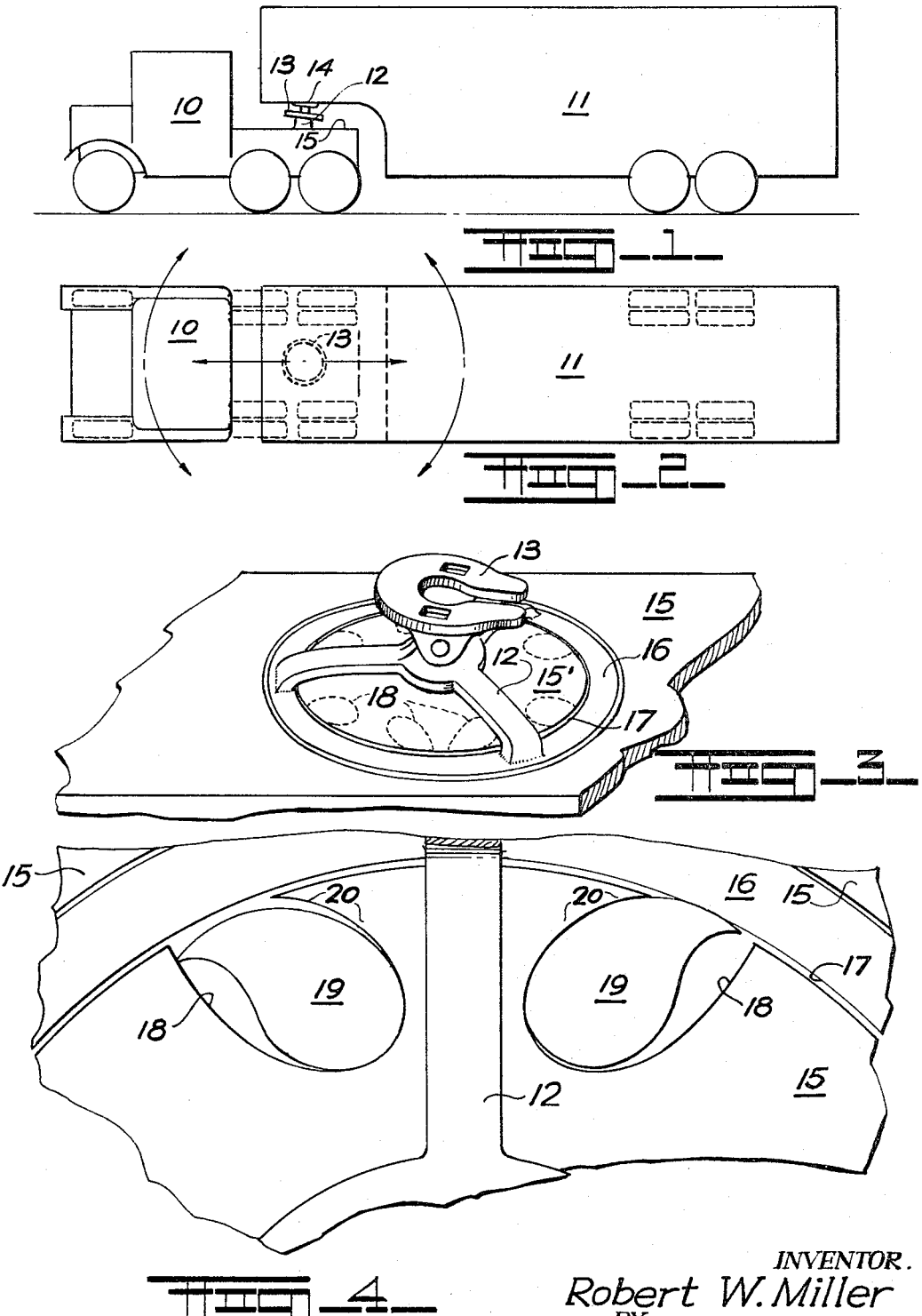

This invention relates to a truck and trailer mounting means and more particularly to a fifth wheel on a truck or tractor to which a trailer is attached and partially supported and towed by the truck or tractor.

The principal object of the invention is the provision of a truck fifth-wheel trailer mounting arranged to permit relatively free rotation of the truck mounting relative to the trailer but to prevent rotation of the trailer mounting relative to the truck.

A further object of the invention is the provision of a truck fifth-wheel trailer mounting which permits normal operation of the truck and trailer but prevents motion of the trailer which would lead to or develop into jackknifing or the like and result in damage to the vehicles.

A still further object of the invention is the provision of a truck fifth-wheel trailer mounting incorporating a plurality of flat teardrop shaped locking members which are movably positioned in appropriately shaped recesses in the truck supporting structure circumferentially of the fifth-wheel trailer mounting and arranged to slidably engage or lockingly engage a closely spaced circular member forming part of the fifth-wheel supporting structure.

The truck fifth-wheel trailer mounting disclosed herein readily permits the pivotal motion of towing truck or tractor relative to the trailer as in the present invention the trailer is secured to the fifth wheel so as to rotate a portion of the fifth wheel with the trailer when a pivoting motion occurs and the trailer attempts to move relative to the truck or tractor. The truck fifth-wheel supporting and holding the trailer is rotatably mounted on a frame of the truck or tractor and the novel slipping or locking members are positioned between the movable part of the fifth wheel and the truck frame portion so that the relative motion of the fifth wheel and the truck frame may be controlled by the device.

With the foregoing and other objects in view which will appear as the description proceeds, the invention resides in the combination and arrangement of parts and in the details of construction hereinafter described and claimed, it being the invention to cover all changes and modifications of the example of the invention herein chosen for purposes of the disclosure, which do not constitute departures from the spirit and scope of the invention.

The invention is illustrated in the accompanying drawing, wherein;

FIGURE 1 is a schematic side elevation of a truck and trailer.

FIGURE 2 is a top plan schematic view of a truck and trailer. Arrows on FIGURE 2 indicating the direction of relative rotation possible between the truck and the trailer and broken lines indicating the pivotal fifth-wheel mounting.

FIGURE 3 is a perspective view on an enlarged scale showing the rotatably mounted truck fifth-wheel on the truck.

FIGURE 4 is an enlarged top plan with parts broken away and parts in cross section illustrating the base of the fifth wheel and the sliding and locking members therein.

By referring to the drawings and FIGURES 1 and 2 in particular, it will be seen that a truck 10 and a trailer 11 are secured to one another by means of a truck fifth wheel 12 which includes an inclined slotted skid plate 13 on which a trailer mounted fifth wheel engaging member 14 is received and secured as will be understood by those skilled in the art. The fifth wheel 12 is rotatably mounted relative to a platform 15 of the truck 10 and it will be observed that the inclined slotted skid plate 13 is pivotally positioned relative to the fifth wheel 12 and a circular rotatable base 16 thereof. The rotatable base 16 is positioned in a circular channel 17 in the truck platform 15. The rotatable base 16 is positioned about a round section 15¹ of the truck platform 15 as defined by the circular channel 17, and the round section 15¹ is provided with a plurality of openings 18 circumferentially spaced around the peripheral edge thereof and communicating with the peripheral edge thereof so that flat teardrop shaped curved locking members 19 positioned one in each of the openings 18 may be retained in operative relation to the circular rotatable base 16 of the fifth wheel 12.

By referring to FIGURES 3 and 4 of the drawings it will be seen that the flat teardrop shaped curved locking members 19 are arranged in oppositely disposed pairs as best illustrated in FIGURE 4 of the drawings and that these oppositely disposed pairs of the locking members 19 are positioned for engagement with the inner annular wall of the circular rotatable base 16. It will further be seen that the portion of the round section 15¹ between each of the opposite pairs of openings 18 in which the locking members 19 are oppositely positioned includes curved pointed sections 20, the curving surface of which is substantially the same shape as the adjacent curving surface of the flat teardrop shaped locking member 19 disposed therein. It will further be seen that the opposite curving surface of each of the openings 18 is considerably flatter and does not correspond with the curving shape forming the pointed extensions 20 in the round section 15¹.

Still referring to FIGURE 4 of the drawing it will be observed that when the round section 15¹ of the truck platform 15 rotates clockwise as seen in FIGURES 3 and 4 by reason of a comparable pivotal motion of the truck 10 relative to the trailer 11, the pointed extension 20 extending to the right as seen in FIGURE 4, will engage the back curving surface of the locking member 19 and move it and prevent it from moving into locking relation between the circular base 16 of the truck fifth wheel 12 and the inner portion of the round section 15¹. At the same time the clockwise motion of the round section 15¹ will cause the relatively flattened curved surface of the left hand opening 18 as seen in FIGURE 4 to engage the point of the flat teardrop shaped locking member 19 as the same attempts to move within the confines of the opening 18 and that in such position the end portion thereof will be out of registry with the circular base 16 of the fifth wheel 12. Thus the round section 15¹ and the truck 10 will move freely in a clockwise position relative to the truck fifth wheel 12.

At such time as the round section 15¹ rotates in the opposite or counterclockwise direction exactly the opposite relative motion of the locking members 19 occurs and they both continue to slidably engage or move in disengaged relation to the rotatable base member 16 and more specifically the circular inner wall 17 thereof.

At such time as the trailer 11 and the fifth wheel 12 attempts to move relative to the truck platform 15 as would be the case when the trailer 11 attempts to move sidewardly in a jackknifing position or the like, the locking members 19 act to prevent such relative motion as the relative movement of the circular base member 16 engages the outermost flatly curved portions of the locking members 19, for example, the one on the right hand side as seen in FIGURE 4 and attempts to pivot it in a counterclockwise direction whereupon its longest dimension wedges between the inner annular surface of the base member 16 and the inner surface of the opening 18 in which it is mounted. Thus such attempted motion of the trailer 11 relative to the truck 10 is stopped. The action just described occurs when the base member 16 of the fifth wheel 12 as seen in FIGURE 4 of the drawing attempts to move in a counterclockwise direction. When it attempts to move in a clockwise direction, the left hand, one of the two locking members 19 seen in FIGURE 4 of the drawing, will move in a pivoting motion from the position shown until its longest dimension engages against the inner annular surface of the base member 16 and the innermost portion of the opening 18 and the same wedging action occurs.

It will thus be seen that the desirable locking action is accomplished by the shape and relative positioning of the locking members 19 in the openings 18 in the round section 15¹ of the truck platform 15 and that they act at all times to permit rotation of the truck platform 15 but act to immediately prevent clockwise or counterclockwise movement of the truck fifth wheel 12 relative thereto.

It will be understood that closure and retaining members are preferably employed on said rotatable base member 16 and said platform 15 to confine said locking members 19, the bottom of said platform 15 can and preferably does support and partially enclose said locking members 19 as illustrated.

It will thus be seen that a truck fifth-wheel mounting has been disclosed which meets the several objects of the invention and having thus described my invention, what I claim is:

1. A truck fifth-wheel trailer mounting arranged to permit relative pivotal rotation of a truck with respect to a trailer to which it is pivotally attached by the fifth-wheel trailer mounting and to prevent relative rotation of the trailer and the mounting means relative to the truck, said trailer mounting comprising a platform on said truck, a circular channel on said platform defining a round section, a rotatable base member mounted in said circular channel, a plurality of circumferentially spaced semi-oval shaped openings in the peripheral edge of the round section, a plurality of flat cam shaped locking members disposed one in each of said openings in said round section and in position to engage the inner annular wall of said base member, said openings in said round section defined by portions of the round section positioned between the openings and one side of each of said portions having pointed extensions extending into said openings and positioned to engage said locking members and hold them in disengaged relation relative to said curved wall when said truck platform and round section moves relative to said base member.

2. The truck fifth-wheel trailer mounting set forth in claim 1 and wherein said openings in said round section are of a size to permit said locking members to move from engagement with said pointed extensions to a position wedgingly engaging said inner annular wall of said base member.

3. The truck fifth-wheel trailer mounting set forth in claim 1 and wherein the platform and rotatable base members include means for retaining locking members in inoperative position in said openings.

4. The truck fifth-wheel trailer mounting set forth in claim 1 and wherein said locking members are flat semi-teardrop shapes with their smaller ends curved to one side.

References Cited

UNITED STATES PATENTS

| | | | |
|---|---|---|---|
| 2,528,076 | 10/1950 | Plaxco | 280—432 |
| 2,667,364 | 1/1954 | Colpo | 280—432 |
| 2,804,314 | 8/1957 | Billingsley | 280—432 |

LEO FRIAGLIA, *Primary Examiner.*